June 27, 1967 AKIRA MATSUSHITA 3,328,270

METHOD OF MANUFACTURING CONDUCTORS HAVING COATINGS OF MAGNETIC MATERIAL PARTIALLY DEPOSITED THEREON

Filed July 16, 1964

INVENTOR.
Akira Matsushita

BY

Wenderoth Lind Ponack 3,328,270

METHOD OF MANUFACTURING CONDUCTORS HAVING COATINGS OF MAGNETIC MATERIAL PARTIALLY DEPOSITED THEREON

Akira Matsushita, Kitatama-gun, Tokyo-to, Japan, assignor to Toko Kabushiki Kaisha, Tokyo-to, Japan, a joint-stock company of Japan Filed July 16, 1964, Ser. No. 383,177
Claims priority, application Japan, July 20, 1963, 38/39,056
2 Claims. (Cl. 204—15)

This invention relates to a novel method of manufacturing conductors having coatings of magnetic material suitable for use in magnetic core matrix memory devices.

Conductors generally utilized in magnetic core matrix memory devices are provided with continuous coatings of magnetic material. Consequently, when the spacing between adjacent bits is too small, there is a disadvantage of mutual interference occurring between adjacent bits. Therefore, it has been proposed to coat the conductor with magnetic material at spaced points or areas where the conductor intersects other conductors.

It is the principal object of this invention to provide a novel method of manufacturing conductors having coatings of magnetic material partially deposited thereon.

Another object of this invention is to provide conductors which have coatings of magnetic material at spaced areas and are especially suitable for use in matrix memory devices.

Further objects and advantages of the present invention will become apparent and this invention will be better understood from the following description, reference being made to the accompanying drawing. The features of novelty which characterize the invention are set forth in the claims annexed to and forming part of this invention.

Figure 1:
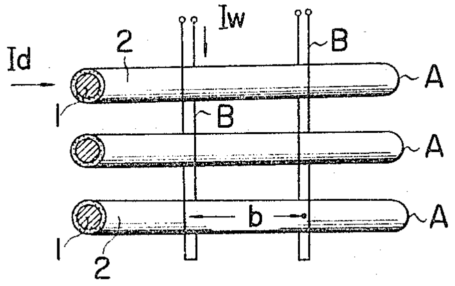
FIG. 1 is a diagram to explain the principle of a magnetic memory device utilizing conductors provided with coatings of magnetic material.

In order to facilitate better understanding of this invention, reference is made to FIG. 1 of the accompanying drawing which shows a portion of a magnetic memory device utilizing conductors having coatings of magnetic material. As shown, the magnetic memory device comprises a plurality of conductors A each consisting of a core conductor 1 of copper, molybdenum, Invar, and the like constituting an electric conductor and a film or coating 2 of a magnetic material such as permalloy or nickel which is deposited on the core conductor by electrolytic plating or vacuum vapor deposition technique (for brevity, hereinafter referred to as a "plated wire") and a plurality of insulated conductors B which are arranged to intersect the plated wires A by weaving, for example, thereby to provide a magnetic matrix containing from several hundreds to several thousands of bits. In operation, digital pulses $I_d$ are passed through the plated wires A, and word driving pulses $I_w$ are passed through the insulated conductors to change the direction of magnetization at the points of intersection between these conductors, thus writing in or reading out information.

Various methods have been proposed to fabricate such a magnetic memory device. For instance, a woven fabric is made comprising wefts consisting of plated wires A and warps consisting of insulated conductors B with or without suitable interwoven spacer wires. Alternatively, plated wires A are enclosed in a printed circuit board having a group of conductors B printed thereon. In any of these types of construction, however, since the coatings 2 of magnetic material are continuous, an excessively small spacing *b* between adjacent conductors B has a tendency to introduce undesirable mutual interference between adjacent bits.

Figure 2:
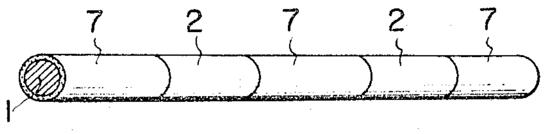
FIG. 2 is a perspective view of a conductor having coatings of magnetic materials deposited thereon at spaced areas.

Therefore, it is advantageous to partially coat the core conductor 1 with magnetic film or to provide coatings of magnetic material 2 thereon at spaced areas, as shown in FIG. 2, where the conductor intersects insulated conductors B instead of applying a continuous magnetic film, thereby decreasing the bit spacing *b* and, accordingly, the physical size of the product. Moreover, eddy current loss in the magnetic coating 2 can be thereby reduced.

However, as the bit spacing *b* is inherently very small (ordinarily of the order of about 3 to 4 mm.), it is very difficult to partially deposit magnetic films 2 on the conductor 1.

Figure 3:
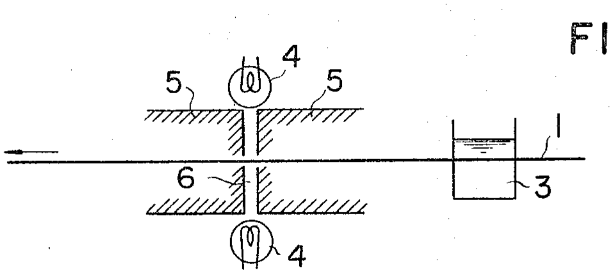
FIG. 3 is a diagrammatic view illustrating the principle of the method of this invention.
Figure 4:
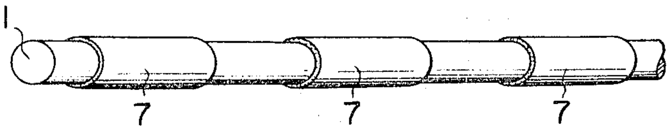
FIG. 4 is a perspective view of a conductor illustrating an intermediate step.

This invention contemplates the provision of a novel method which can effectively solve this problem. Referring now to FIG. 3 which diagrammatically illustrates important steps of the method of this invention, a core conductor 1 is pulled to move in the direction indicated by the arrow to pass through a bath 3 of light sensitive material. The core conductor with a coating of the light sensitive material is then passed across a slit 6 defined between a pair of light shields 5 to be irradiated by light rays emitted from intermittently operating light sources 4. Thus, spaced sections of the coating of light sensitive material are exposed to the light rays. Then the core conductor 1 is baked to form insulating films 7 on the conductor 1 at only the sections where the coating of the light sensitive material has been exposed to light rays. The core conductor 1 is then subjected to an electrolytic plating process to form coatings 2 of magnetic material only on the sections between insulating films 7, thus providing a product as shown in FIG. 2. Since this process can be carried out continuously, it is suitable for mass production.

As can be observed from the foregoing description, this invention provides a novel method of continuously manufacturing conductors having coatings of magnetic material at spaced areas wherein the spacing and axial width of the coating can be regulated to any desired value by adjusting the speed of travel of the core conductor and the period of intermittent operation of the light sources 4.

While the invention has been explained by describing a particular embodiment thereof, it will be apparent that improvements and modifications may be made therein without departing from the scope of the invention as defined in the appended claims.

What I claim is:

1. A method of manufacturing a conductor having a coating of magnetic material partially deposited thereon comprising the steps of applying a film of light sensitive material on a core conductor moving in a definite direction, passing said conductor across a slit to partially expose said film of light sensitive material to light rays emanating from an intermittently operating source of light, baking the conductor to form insulating films only at sections which have been exposed to said light rays and forming coatings of magnetic material on the remaining sections by electrolytic plating.

2. The method according to claim 1 wherein said core conductor is made of an electric conductor material selected from the group consisting of copper, molybdenum and Invar, and wherein said coatings of magnetic material are made of a substance selected from the group consisting of permalloy and nickel.

References Cited

UNITED STATES PATENTS

| | | | |
|---|---|---|---|
| 1,895,760 | 1/1933 | Hunt | 204—18 |
| 2,914,403 | 11/1959 | Sugarman | 204—15 |
| 3,189,532 | 6/1965 | Chow et al. | 204—43 |
| 3,280,012 | 10/1966 | Clinehens et al. | 204—43 |

JOHN H. MACK, *Primary Examiner.*

T. TUFARIELLO, *Assistant Examiner.*